United States Patent [19]

Gillis et al.

[11] Patent Number: 5,002,830

[45] Date of Patent: Mar. 26, 1991

[54] FIBROUS REINFORCED MATERIALS IMPREGNATED WITH LOW VISCOSITY POLYURETHANES/UREA FORMING COMPONENTS

[75] Inventors: Herbert R. Gillis, Sterling Heights, Mich.; I. Sioun Lin, Hong Kong, Hong Kong

[73] Assignee: ICI Americas Inc., Wilmington, Del.

[21] Appl. No.: 388,183

[22] Filed: Aug. 1, 1989

[30] Foreign Application Priority Data

Aug. 12, 1988 [GB] United Kingdom ................ 8819297

[51] Int. Cl.[5] ........................ B32B 27/00; B32B 27/40

[52] U.S. Cl. .................... 428/423.1; 252/182.13; 252/182.23; 264/331.19; 521/121; 521/129; 521/130; 521/163; 528/44; 528/48; 528/49; 528/57; 528/73; 528/76

[58] Field of Search .............. 264/331.19; 252/182.13, 252/182.23; 521/121, 129, 130, 163; 528/44, 48, 49, 57, 73, 76; 428/423.1

[56] References Cited

U.S. PATENT DOCUMENTS 4,513,133 4/1985 Dominguez ................ 264/331.19 X
4,582,879 4/1986 Frisch et al. .............. 264/331.19 X
4,794,129 12/1988 Gillis et al. .................... 252/182.23

Primary Examiner—Michael Lusignan

[57] ABSTRACT

Improved reinforced polyurethane/urea articles are made by reacting an organic polyisocyanate with low viscosity imino/enamine-functional compounds in contact with fiberous reinforcing agents.

10 Claims, No Drawings

FIBROUS REINFORCED MATERIALS IMPREGNATED WITH LOW VISCOSITY POLYURETHANES/UREA FORMING COMPONENTS

This invention relates to composite materials and more especially to fibre-reinforced polymeric materials and to methods for their production.

Recent years have seen the development of high modulus structural materials, for example Structural RIM, based on polyurethane and other polymer systems derived from organic polyisocyanates. Particularly valuable products are obtained using the Reaction Injection Moulding (RIM) technique to pump the components of a polymer-forming reaction mixture into a closed mould containing a pre-placed reinforcing material, for example a high density woven glass mat.

In order to obtain optimum properties from these mat-reinforced systems, it is essential that the components of the reaction mixture penetrate the reinforcing material completely before gelation takes place. The major components of the reaction mixture should therefore have very low viscosities and should react in a stepwise manner, little or no reaction taking place during filling of the mould followed by a very fast polymerisation to permit short mould residence times. The lower the initial viscosity of the reaction mixture, the more thoroughly it can penetrate the reinforcement before gelation takes place thus permitting higher levels of reinforcement to be used and thereby providing products having enhanced modulus and impact resistance.

Reaction mixtures of the type under discussion generally comprise two component streams, a polyisocyanate component and an isocyanate-reactive component. In the case of the polyisocyanate stream, the lowest viscosity materials available will be the unmodified polyisocyanates, for example diphenylmethane diisocyanate (MDI) above its melting point. Some of the prepolymers derived from MDI will be completely unsuitable because of their high viscosities but other MDI variants can be used in conjunction with appropriate low viscosity isocyanate-reactive components. The choice of isocyanate-reactive component for these systems is more difficult since most isocyanate-reactive material, including all the polyols used in the manufacture of polyurethanes, have relatively high viscosities. Propylene carbonate, which has a viscosity of only 3.5 centipoises at 25° C., has been used in a polyisocyanurate structural RIM system but, because of the high isocyanate index required by a polyisocyanurate system, the major component of the system is the polyisocyanate which has a higher viscosity than propylene carbonate. Furthermore, polyisocyanurate systems have the disadvantage, in the present context, of gelling at very low conversions and thereby limiting the flow at a relatively early stage of the reaction. It has now been found that imino-functional compounds and enamine containing compounds are particularly suitable isocya- nate-reactive compounds for use in the production of fibrereinforced polymeric materials.

Accordingly, the present invention provides a method for the production of a composite material which comprises impregnating a fibrous reinforcing material with a polymer-forming reaction mixture comprising:

1) a polyisocyanate component having a viscosity less than 100 centipoises, and
2) an isocyanate-reactive component having a viscosity less than 100 centipoises containing an imino-functional compound or enamine containing compound having a molecular weight greater than 43 and a viscosity less than 50 centipoises, wherein said viscosities are measured at 25 C or at the melting point in the case of materials that are solid at 25° C.

The polyisocyanate component used in the method of the invention contains an organic polyisocyanate and optionally one or more other ingredients of isocyanate-based reaction systems with the proviso that such ingredients must not be reactive towards the polyisocyanate under the conditions used for storage and processing.

Any organic polyisocyanate may be present in the polyisocyanate component provided the latter has the required low viscosity. From the reactivity viewpoint, aromatic polyisocyanates are preferred, for example diphenylmethane and toluene diisocyanates and their low viscosity derivatives. Especially useful are 4,4'-MDI and mixtures thereof with the 2,4'-isomer although these are solid materials at normal ambient temperatures and will need to be processed at higher temperatures or used in the form of liquid blends with other ingredients. Other useful polyisocyanates include uretonimine modified MDI having an NCO content greater than about 30% by weight. Polymeric MDI may be used but is preferably blended with a lower viscosity polyisocyanate such as a 4,4'-/2,4'-MDI isomer mixture.

The viscosity of the polyisocyanate component is preferably less than 50 centipoises, more preferably less than 25 centipoises and most preferably less than 10 centipoises at 25° C. or at the melting point in the case of solid polyisocyanate components. When polyisocyanate components which are solid at 25° C. are used, their melting points are preferably not greater than 50° C. The isocyanate-reactive component used in the method of the invention contains an imino-functional compound or enamine containing compound having the equivalent weight and viscosity characteristics defined above and optionally one or more other ingredients of isocyanate-based reaction systems with the proviso that such ingredients must not be reactive towards the imino-functional compound or enamine under the conditions used for storage and processing.

Imino-functional compounds which may be present in the isocyanate-reactive component contain at least one imino group per molecule and conform to the general structure:

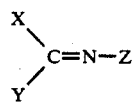

wherein

X, Y and Z are chemical moieties which collectively form the rest of said compound and are each independently selected from the group consisting of H and organic radicals which are attached to the imino unit

of said compound through N, C, 0, S, Si or P the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through an atom selected from C, N and O. It is most preferred that X, Y and Z are attached through saturated atoms, preferably aliphatic carbon atoms.

Many types of imino-functional compounds are useful in this invention, including (but not limited to) those listed in Table A, following:

TABLE A

| TYPE | |
|---|---|
| $\text{(P)}-R^5-NH-\underset{\underset{NHR^6}{\|}}{C}=NR^6$ | Guanidine |
| $\text{(P)}-R^5-NR^7-\underset{\underset{NR^8_2}{\|}}{C}=NR^8$ | Guanidine |
| $\text{(P)}-R^5-NH-\underset{\underset{NHAr'}{\|}}{C}=NAr'$ | Guanidine (aromatic) |
| $\text{(P)}-R^5-O-\underset{\underset{NHR^6}{\|}}{C}=N-R^6$ | Isourea |
| $\text{(P)}-R^5-O-\underset{\underset{NH_2}{\|}}{C}=N-R^7$ | Isourea | wherein:

$R^5$ and Ar are divalent aliphatic and aromatic organic linking groups, respectively;

(P) represents an organic chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R^5$ may in particular be propylene, Ar methoxyphenylene, $R^6$ propyl, $R^7$ propyl, $R^8$ propyl and Ar' methoxyphenyl.

It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated.

When aromatic groups are present in the imino unit it is preferable that they be attached to the carbon atom of said unit and it is most preferred that said aromatic group bear electron donating substituents such as hydroxy, alkoxy N,N-dialkyl-amino etc.

The preparation of these imino functional groups in both cyclic and acyclic forms is well known in the literature.

Isoureas are generally prepared by the reaction of an alcohol with a carbodiimide in the presence of a suitable catalyst. The alcohol component may be aliphatic, as described in E. Schmidt, F. Moosmuller, Lieb. Ann. 597, 235, (1956), or aromatic as in E. Vowinkel, Chem. Ber., 96. 1702, (1963). The catalyst employed in these reactions are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965).

However the reaction can also be carried out by the addition of an alkaline metal to the alcohol component as exemplified by the use of sodium metal in H.G. Khorana, Canad. J. Chem. 32, 261, 1953.

Guanidines can be prepared by the reaction of an amine with a carbodiimide in a manner similar to that outlined in the references cited above. Alternatively alkylguanidines may be prepared by the reaction of an alkylamine salt with dicyandiamide as in E.A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968.

A general review of the preparation of imidates is given in "The Chemistry of amidines and imidates", Ed. S. Patai, chapter 9, "Imidates including cyclic imidates", D.G. Neilson, John Wiley, London, 1975. This work includes references to the preparation of the analogous thioimidates.

The preparation of acyclic imidates by the combination of an aliphatic or aromatic nitrile with an alcohol under acidic or basic conditions is described in F.C. Schaefer, G.A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A.R. Katritzky, A.R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro1,3-thiazines. Methods for the preparation of oxazolines and oxazines are also described in U.S. Pat. No. 3630996 to D. Tomalia, U.S. Pat. No. 3640957 to D. Tomalia and R.J. Thomas, in H. Witte, W. Seeliger, Angew. Chem. Int. Ed., 1972, 287 and in U.S. Pat. No. 3813378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds : Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4006247 to H.P. Panzer.

The preparation of the homologous tetrahydropyrimidines can be achieved in a similar manner by the use of 1,3-propanediamine as the diamine component. Specific methods are described in "The Chemistry of Heterocyclic Compounds : The Pyrimidines, Supplement I", Ed. A. Weissberger and E.C. Taylor, author D.J. Brown, Interscience Publishers, New York, 1953.

The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein.

The imino-functional compounds should contain at least one imino unit per molecule, preferably from one to four such units. Preferred compounds have molecular weights not greater than 1500, preferably in the range from about 43 to about 600. Examples of preferred imino-functional compounds include simple aldimines or ketimines such as may be obtained by reacting aldehydes, for example formaldehyde, acetaldehyde, propionaldehyde, n-butyraldehyde, isobutyraldehyde, heptaldehyde, alphamethylvaleraldehyde, beta-methylvaleraldehyde, mono-amines for example methylamine, ethylamine, propylamine, n-butylamine, isobutylamine, hexylamine or cyclohexylamine and mixture thereof and polyamines, especially diamines, for example 1,6-hexane diamine, isophorone diamine or methane diamine and mixtures thereof.

Enamine containing compounds which may be present in the isocyanate-reactive component include compounds having the structures:

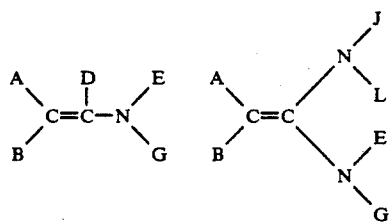

wherein each of A, B, E, G, J and L, independently, represents hydrogen or, preferably, an optionally substituted hydrocarbon radical, any of A, B, E, G, J and/or L optionally being joined together to form one ore more carbocyclic or heterocyclic rings, and D represents hydrogen or an optionally substituted hydrocarbon radical. Suitable enamine containing compounds may be obtained in known manner by reacting a carbonyl compound containing at least one alpha-hydrogen atom with a secondary amine, for example morpholine or piperazine.

Mixtures of imino-functional compounds and/or enamine containing compounds may be used if desired.

The viscosity of the imino-functional compound or enamine containing compound is preferably less than 25 centipoises, more preferably less than 10 centipoises and most preferably less than 5 centipoises at 25 C or at the melting point in the case of solid materials. When imino-functional compounds or enamine containing compounds which are solid at 25 C are used, their melting points are preferably not greater than 50° C.

The molecular weight of the imino-functional compound or enamine containing compound is preferably greater than 102, more preferably greater than 120 and most preferably greater than 150. The maximum molecular weight will generally be determined by the requirement that the viscosity must be less than 50 centipoises at 25° C. or at the melting point. The isocyanate-reactive component may contain one or more other isocyanate-reactive materials in addition to the imino-functional compound and/or enamine containing compound. Examples of such isocyanate-reactive materials include propylene carbonate and polyols. Because of the low viscosity requirement, any polyol present in the isocyanate-reactive component will generally have low molecular weight, for example ethylene glycol, diethylene glycol, triethanolamine or glycerol.

The viscosity of the isocyanate-reactive component is preferably less than 50 centipoises, more preferably less than 25 centipoises and most preferably less than 10 centipoises at 25° C. or at the melting point in the case of solid isocyanate-reactive components.

The isocyanate-reactive conponent may advantageously be processed under a blanket of dry carbon dioxide which will react with any amine formed by adventitious hydrolsis of imines or enamines. Dry air or nitrogen may also be employed as blanketing gases.

In operating the method of the invention, the polyisocyanate component and the isocyanate-reactive component are typically reacted at an isocyanate index between about 70 and about 2500, the isocyanate index being the ratio of isocyanate equivalents to isocyanate-reactive functional groups. Preferably, the index is between about 95 and about 1200, more preferably between about 100 and about 1000, still more preferably between about 105 and about 500 and most preferably between about 110 and about 300.

Other ingredients which may optionally be present in one or more of the reactant streams or in a separate stream include blowing agents, particulate fillers, pigments, fire retardants, plasticisers, coupling agents, internal mould release agents, surfactants, foam stabilisers, additional monomers and catalysts.

Suitable blowing agents include those conventionally used in the production of isocyanate based foams, for example water and inert volatile liquids such as halogenated hydrocarbons, for example trichlorofluoromethane. The amount of blowing agent is selected in known manner to give a product having the desired density.

Suitable internal mould release agents include metal salts of fatty acids and silicones. Fatty acid salts such as zinc stearate, zinc oleate, zinc palmitate, zinc laurate, zinc octoacte, zinc behenate, zinc ricinoleate and the calcium, magnesium, nickel and copper salts of lauric, palmitic, stearic and oleic acids are effective with zinc stearate being preferred. Suitable surfactants and/or foam stabilisers include the siloxane-oxyalkylene copolymers used in polyurethane formulations.

Suitable additional monomers include polymerisable unsaturated compounds such as unsaturated polyesters or polyamides, urethane polyacrylates and vinyl or acrylic monomers, for example acrylic and methacrylic acids and their methyl, ethyl, 2-hydroxyethyl and butyl esters, acrylonitrile, styrene, alpha-methylstyrene, N-vinylpyrrolidone, maleimides and the like and mixtures of two or more such monomers. Epoxy monomers are also suitable. These additional monomers may be present in the polyisocyanate or isocyanate-reactive component depending upon their chemical compatibility with the other ingredients. Monomers which are not isocyanate-reactive are particularly useful for blending with the organic polyisocyanate to produce a low viscosity polyisocyanate component. Alternatively, they may form a separate stream which must have a viscosity less than 100 centipoises at 25° C. Any additional monomers, whether in a separate stream or in one of the other streams, preferably have viscosities less than 50 centipoises, more preferably less than 25 centipoises and most preferably less than 10 centipoises at 25° C. Any catalysts required to promote the polymerisation of these additional monomers, for example free radical catalysts, will preferably be present in a stream different from the stream containing the monomer. The polymer-forming reaction mixture will normally contain one or more catalysts for the reactions of the organic polyisocyanate in addition to any catalysts that may be required for the polymerisation of vinyl or other additional monomers. Thus, the reaction mixture may contain catalysts for the polymerisation, for example trimerisation, of polyisocyanates and/or catalysts for the reactions between isocyanates and active hydrogen compounds. Both types of catalyst have been fully described in the prior art although many catalysts are effective for more than one type of reaction, for example trimerisation and reaction with a hydroxy compound, so that a clear distinction between catalysts on the basis of their function is not always possible.

Typical catalysts include members of the following classes:

1) Tertiary amines, for example trialkylamines such as triethylamine, dialkylcycloalkylamines such as N, N-dimethylcyclohexylamine, dialkylaralkylamines such as N, N-dimethylbenzylamine, N-alkyl-morpholines, piperidines and pyrrolidines, N, N-dialkylpiperazines, bis (dimethylaminoethyl) ether, 1,4-diazabicyclo[2.2.2]octane, N, N', N''-tris (dialkylaminoalkyl) hexahydrotriazines such as N, N', N''-tris (dimethylaminopropyl) hexahydrotriazine, tris (dialkylaminoalkyl) phenols such as 2, 4, 6-tris (dimethylaminomethyl)phenol,- tetra-alkylguanidines such as N, N, N', N'-tetramethylguanidine and alkanolamines which may function as catalysts and isocyanate-reactive compounds such as N-methyldiethanolamine, triethanolamine and N, N, N', N'-tetrakis (2-hydroxypropyl)ethylene diamine, 2) Combinations of tertiary amines with epoxy compounds such as propylene oxide or phenyl glycidyl ether, Alkali metal salts of lower alkanoic acids, for example the sodium, potassium and lithium salts of acetic, butyric and 2-ethylhexoic acids, Non-basic metal salts of lower alkanoic acids, for example lead octoate and stannous octoate, Dialkyltin salts, for example dibutyltin dilaurate and dibutyltin diacetate.

Combinations of catalysts from the same or different classes may be used and this may often be advantageous. When such combinations are used, the catalysts may be pre-mixed or segregated into separate streams of the reaction system. In addition to the above mentioned classes, acidic catalysts may be used. These include proton acids, for example carboxylic acids and organic sulphonic acids, Lewis acids and acid precursors, for example acid anhydrides.

The total catalyst concentration present in the polymer-forming reaction mixture is important, optimum concentration for specific applications being easily determined by one skilled in the art. In general, the catalyst concentration should be such as to provide a gel time, under the conditions of formulation and processing, greater than 0.5 second, preferably greater than 1 second, more preferably greater than 2 seconds and most preferably greater than 3 seconds. In the case of moulding processes, the catalyst concentration should also preferably provide a residence time less than 2 minutes, more preferably less than 1 minute, still more preferably less than 30 seconds and most preferably less than 15 seconds.

The method of the invention may be performed by bringing together the polyisocyanate component and the isocyanate-reactive component in any manner which will provide efficient mixing of the reactants and which will allow rapid transfer of the resulting reaction mixture to a receiving means containing the fibrous reinforcing material and impregnation of said fibrous material before gelation takes place. In general, the separate components are pumped under pressure to a mixing chamber from where the liquid reaction mixture is poured, ejected, pumped or otherwise dispensed on to the fibrous reinforcing material in a mould or some suitable receiving means where polymerisation takes place.

The fibrous reinforcing material is suitable in the form of a mat which may be woven or non-woven. Single mats or layers of mats may be used, multi-ply mats being especially useful. The fibrous material may comprise a single type of fibre or a mixture of fibres. Suitable fibres include glass, carbon, aramids, polyamides, polyesters, cellulosics, wood, metal (for example wire), alumina, zirconia, rockwool and the like. The content of fibrous material is typically at least about 10 %, preferably greater than 25 %, more pr eferably greater than 60 % by weight of the reinforced polymer composite.

The method of the invention is particularly conveniently operated using the reaction injection moulding technique whereby the polyisocyanate and isocyanate-reactive components are impingement mixed and rapidly injected into a mould cavity containing the fibrous material. A resin transfer process may also be used or a pultrusion process in which long continuous mats or fibre bundles are pulled through the liquid reaction mixture and then through a die which determines the cross-section of the composite product. Mixing and spraying the reaction components on to the fibrous material is another useful method. The various techniques will require different reaction rates which can be provided by appropriate choice of catalysts and catalyst concentration.

Products obtained by the method of the invention are characterised by their toughness, high flex modulus and excellent impact and thermal properties. They are especially useful in the automotive industry, potential applications including body panel exteriors, underbody sections, bumper beams, pickup truck beds and spare wheel covers.

The invention is illustrated but not limited by the following example:

EXAMPLES

Examples of suitable low viscosity imines are described in Table 1 and representative enamines are listed in Table 2.

TABLE 1

| Component | Viscosity (25° C.) | Molecular weight |
|---|---|---|
| Methyl ethyl ketone (MEK) imine of isophoronediamine | 18.7 | 264 |
| MEK imine of hexamethylenediamine | 4.3 | 224 |
| MEK imine of 2-methylpentane 1,5-diamine | 4.0 | 224 |
| Cyclohexanone imine of n-butylamine | 3.3 | 153 |
| Cyclohexanone imine of cylohexylamine | 5.7 | 179 |
| Methylamine imine o-hydroxybenzaldehyde | 8.0 | 135 |
| Methylethylketone imine of n-butylamine | 2.1 | 127 |
| Methylethylketone imine of cyclohexylamine | 2.5 | 153 |

TABLE 2

| Component | Viscosity (25° C.) | Molecular Weight |
|---|---|---|
| Isobutyraldehyde enamine of morpholine | 5.4 | 141 |
| Isobutyraldehyde bis-enamine of piperazine | 5.0 | 194 |

Isocyanate-reactive compositions for use in the method of the invention were prepared from the formulations described in the following Tables.

The viscosities of the compositions were measured on a standard Brookfield LVT viscometer at 23 C using spindle No. 2 for viscous materials and spindle No. 1 for less viscous materials.

The polyether polyol used in the formulations was an ethylene oxide capped polyoxypropylene diol having a hydroxyl number of 52 and an ethylene oxide content of 12.4 % by weight. The amounts of components given in the Tables are on a weight basis.

The imines used in the formulations described in Tables 3-5 are as follows:

A Cyclohexanone imine of Jeffamine D-400
B Methyl ethyl Ketone (MEK) imine of m-xylene diamine
C MEK imine of isophorone diamine
D MEK imine of hexamethylene diamine
E MEK imine of 2-methylpentane diamine

TABLE 3

| Component | Molecular Weight | 1 | 2 | 3 | 4 |
|---|---|---|---|---|---|
| Polyether | 2154 | 108 | 108 | 108 | 108 |
| B | 244 | 177 | — | — | — |
| C | 264 | — | — | — | — |
| D | 224 | — | 846 | 112 | — |
| E | 224 | — | — | — | 83.6 |
| Viscosity at 23° C. (centipoises) | | 46.4 | 51.0 | 39.1 | 49.5 |

TABLE 4

| Component | Molecular Weight | 5 | 6 | 7 | 8 | 9 | 10 |
|---|---|---|---|---|---|---|---|
| Polyether | 2154 | 108 | 108 | 108 | 108 | 108 | — |
| E | 224 | 126 | 187 | 281 | 563 | 952 | 100 |
| Viscosity at 23° C. (centipoises) | | 34.4 | 22.5 | 15.5 | 9.9 | 7.2 | 6.2 |

EXAMPLE 1

Test sheets having a dimension of 500 x 500 x 3 millimeters can be made in a reaction injection moulding machine such as manufactured by Krauss Maffei, Munich, West Germany under Model No. RIM-STAR 16/8. The press is opened and the mould is sprayed with an external release agent Chemtrend CT 8203. One or more layers of sized continuous strand mat such as (OCF M8610, 450 g/m$^2$, manufactured by Owens Corning) are placed in the mould. The mould is then closed and sealed sufficiently to prevent low viscosity fluids from leaking when in-mould pressures up to 40 bars are employed. An A component and B component can be impingement mixed in a mixing head (MK 10, manufactured by Krauss Maffei) at rates of 100 parts of B to 300–1000 parts of A. Before injecting, the mould temperature is heated to about 75–100° C. Components A and B are held at 20–35° C. and injected at rates as high as 150 g per second at shot times up to 6 seconds. When 40 percent glass is employed, 540 grams of resin is needed to fill the mould at a shot time of 3.6 seconds. The mould may be opened after about 1 minute and often 30 seconds.

A Comoonent Uretonimine-modified MDI (SUPRASEC VM 20).

B Component 55.9 percent of a MEG-started polypropylene polyether polyol having 12.4 percent ethoxylated tip 43.3 percent of imine E 0.7 percent of DABCO T-12 (Air Products)

0.7 percent of a trimerisation catalyst (DABCO T 45)

Operating conditions will vary depending on the imine or enamine blends employed as B component. It is expected that the B components comprising the components listed in Tables 3 and 4 will operate in the manufacture of fibrous-reinforced test sheets.

What is claimed is:

1. A method for the production of composite material which comprises impregnating a fibrous reinforcing material with a polymer-forming reaction mixture comprising :

1 a polyisocyanate component having a viscosity less than 100 centipoises, and
   2 an isocyanate-reactive component having a viscosity less than 100 centipoises containing an iminofunctional compound or enamine containing compound having a molecular weight in the range from about 43 to about 600 and a viscosity less than 50 centipoises, 2. A method according to claim 1 wherein the imino-functional compound has the formula:

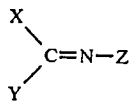

wherein

X, Y and Z are chemical moieties which collectively form the rest of said compound and are each independently selected from the group consisting of H and organic radicals which are attached to the imino unit C=N— of said compound through N, C, O, S, Si or P ; the central carbon atom of said imino unit being bonded to three atoms.

3. A method according to claim 2 wherein said imino-functional compound contains from 1 to 4 imino units.

4. A method according to claim 1 wherein said enamine containing compound has the formula :

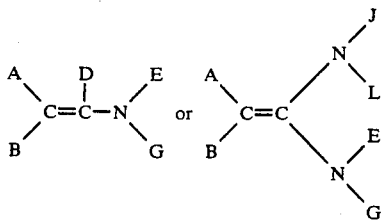

wherein each of A, B, E, J and L, independently, represents hydrogen or an optionally substituted hydrocarbon radical, any of A, B, E, G, J and/or L optionally being joined together to form one or more carbocyclic or heterocyclic rings, and D represents hydrogen or an optionally substituted hydrocarbon radical.

5. A method according to claim 1 wherein the viscosity of said imino-functional compound or enamine containing compound is less than 25 centipoises at 25 C or at the melting point in the case of a compound that is solid at 25° C.

6. A method according to claim 1 wherein said reaction mixture contains a polymerisable unsaturated compound or epoxy monomer.

7. A method according to claim 1 wherein said composite material contains at least about 10 % by weight of the fibrous reinforcing material.

8. A method according to claim 1 wherein said polyisocyanate and isocyanate-reactive components are reacted together in combination with internal mould release agents selected from salts of fatty acids and silicones using the reaction injection moulding technique.

9. A method according to claim 8 whehrein said reinforcing fiber is placed in a reaction injection mould.

10. A cured reinforced composite made according to claim 1.

* * * * *